Figure 1:
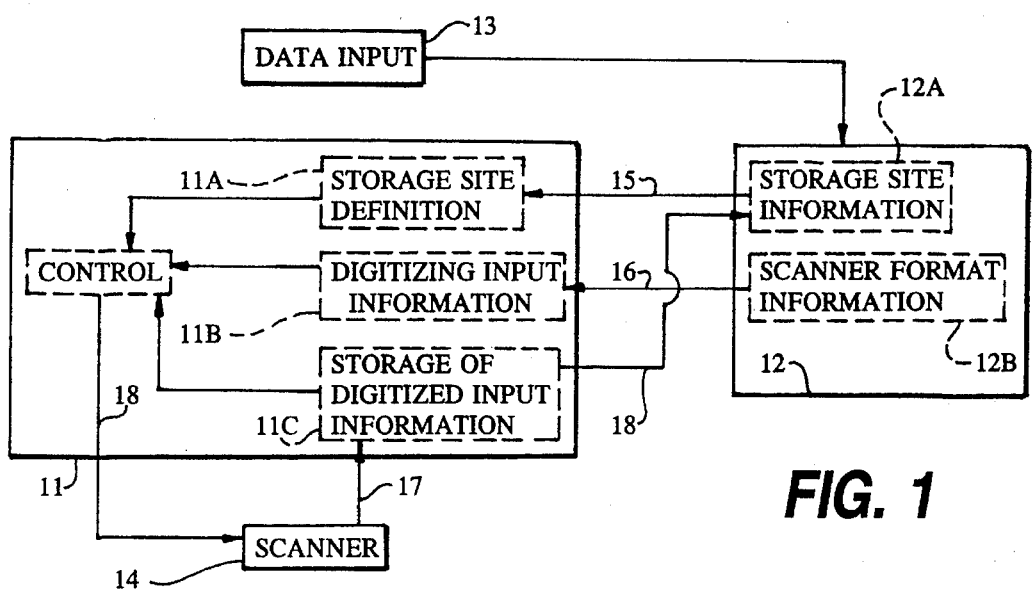

United States Patent [19]

Bhatt

[11] Patent Number: 5,596,753

[45] Date of Patent: Jan. 21, 1997

[54] SCANNER INTERACTIVE APPLICATION PROGRAM

[75] Inventor: Bhuvnesh J. Bhatt, Stoughton, Mass.

[73] Assignee: Fairhaven Software, Inc., New Bedford, Mass.

[21] Appl. No.: 337,105

[22] Filed: Nov. 10, 1994

[51] Int. Cl.$^6$ .......................................................... G06F 3/00
[52] U.S. Cl. ........................ 395/682; 364/280; 364/284.2; 364/DIG. 1
[58] Field of Search ..................................... 395/700, 650, 395/824, 828, 892, 893

[56] References Cited

U.S. PATENT DOCUMENTS

| 4,804,949 | 2/1989 | Faulkerson | 345/166 |
| 4,906,843 | 3/1990 | Jones et al. | 250/221 |
| 5,012,407 | 4/1991 | Finn | 395/700 |
| 5,309,555 | 5/1994 | Akins et al. | 395/157 |
| 5,315,097 | 5/1994 | Collins, Jr. et al. | 235/472 |

*Primary Examiner*—Kevin A. Kriess
*Attorney, Agent, or Firm*—Tod R. Nissle, P.C.

[57] ABSTRACT

A system for utilizing digitized input information in an application program enables the application program to communicate with a scanner.

4 Claims, 2 Drawing Sheets

SCANNER INTERACTIVE APPLICATION PROGRAM

This invention pertains to systems for processing information.

More particularly, the invention relates to a system for utilizing digitized input information in an application program.

As used herein, the following terminology is defined as noted.

Application Programs: (1) Programs that perform specific tasks, such as word processing programs, database programs, and desktop publishing programs. (2) A program that is specific to the solution of an application problem. (3) A program written for a user that applies to the user's work, such as a program that does inventory control or payroll.

Application Problem: A problem submitted by an end user and requiring information processing for its solution.

Batch Processing: (1) A process in which a computer works while unattended. (2) The processing of data or the completing of tasks accumulated in advance, in such a way that the user cannot influence processing while it is under way. (3) The processing of data accumulated over a period of time. (4) Loosely, the execution of computer programs serially. (5) The procedure of executing a group of computer programs such that each program is completed before the next program in the group is started. (6) In real time systems the processing of related transactions that have been grouped together. (7) Processing in which there is little or no operator action.

Clipboard: (1) A temporary storage location in a database. Data can be copied from a record to the clipboard, or can be sent from the clipboard to another record, another place (storage location), or another thing.

Data: (1) A re-interpretable representation of information in a formalized manner suitable for communication, interpretation or processing. Operations can be performed on data by human beings or by automatic means. (2) Examples: absolute data, alphanumeric data, analog data, digital data, discrete data, input data, numeric data, output data, relative data, test data.

Database: (1) A collection of related records or information, stored on a computer and organized to make any part of it easily accessible. Also called databank. (2) A collection of data with a given structure for accepting, storing, and providing, on demand, data for one or more users. (3) A collection of interrelated data organized according to a database scheme to serve one or more applications. (4) A collection of data fundamental to a system. (5) A collection of data fundamental to an enterprise.

Data File: A collection of related data that is stored and retrieved by an assigned name.

Desktop Publishing Program: Desktop publishing programs position text and graphics and often merge text and graphics on the same page. Most desktop publishing programs presently have limited or no word processing capabilities.

Environment: See operating environment.

Environment Variable: An instruction stored in the environment that controls, for example, how to display characters or symbols, where to store any temporary files, and the path of directories which are searched to find commands. In the DOS operating program, the PATH, COMSPEC, PROMPT, and SET commands in the AUTOEXEC.BAT file all define environment variables.

Field: An individual data item comprising the smallest identifiable part of a record. A field can have one or more alphanumeric characters or other symbols.

Graphic: A symbol produced by a process such as handwriting, drawings, or printing.

Graphical Data Display Manager (GDDM): A group of routines that allows pictures to be define and displayed procedurally through function routines that correspond to graphic primitives. A GDDM is typically part of an operating system and can also be part of a program used to manipulate images.

Graphic Character: (1) A visual representation of a character, other than a control character, that is normally produced by writing, printing or displaying. (2) A character that can be displayed or printed.

Graphic File Format: Any of several formats for storing computer graphics. Examples: DXF (Drawing Interchange Format), EPS (Encapsulated Postscript), IGES (Initial Graphics Exchange Specification), TIFF (Tag Image File Format), and PCX.

Graphics: In personal computing, the creation, modification, and printing of computer-generated graphic images. The two basic types of computer-produced graphics are vector graphics and bit-mapped graphics.

Graphics Character: In a computer's built-in character set, a character composed of lines, shaded rectangles, or other shapes. You can combine graphics characters to form block graphics, simple images, illustrations, and borders.

Image: (1) An electronic representation of a picture generated utilizing sensing light, sound, electron radiation, or other emanations coming from the picture or reflected by the picture. An image can also be generated independently by software without utilizing an existing picture. (2) An electric representation of a document, art work, photograph, or other object or thing recorded by a scanning device. (3) An image is not generally entered by computer keyboard. (4) Images presently are normally stored outside of a record.

Input Information: Artwork, photographs, documents, or other objects or things digitized by a scanner.

Image Data: Digital data derived from electrical signals that represent a visual image.

Image file: A data file containing an image.

Image File Structure: See graphic file format. There presently are about 15 different graphic file formats, one of which is termed PCX.

Image Processing: The use of a data processing system to create, scan, analyze, enhance, interpret, or display images.

Operating System: (1) Software for a computer which oversees functioning of the computer. (2) A master control program for a computer that manages the computer's internal functions and provides a means to control the computer's operations.

Operating Environment Program: A program, like WINDOWS, which enhances an operating system and makes it easier for a user to use. In Windows to copy a file, we only ask what is the name of the file. WINDOWS lists all files in operating system systems and knows where the files are and the name of the files.

Record: In a database management program, a complete unit of related data items stored in named data fields. A data record normally contains all the data related to the item the database is tracking, Information pertaining to the item the database is tracking may be stored outside the record. For example a data record can contain data consisting of the beginning inventory and the amount of inventory sold. The amount of inventory remaining after the amount sold is deducted from the beginning inventory is termed information and may be stored outside of the record.

Record Format: The definition of how data are structured in the records contained in a file. The definition includes record name, field names, and field description, such as length and data type. The record formats used in a file are contained in the file description.

Record Processing: A set of one or more related data items grouped for processing.

Scanner: A peripheral device that digitizes artwork, photographs, documents, or other objects or things and transmits a digitized data stream representing the artwork, photographs, documents, or things. By way of example, a scanner can consist of any conventional scanner for digitizing imprinted pages, of a camera which produces a digitized signal of an object or thing viewed by the camera, etc.

SCL: (1) Scanner control language. (2) Scanner control language is a group of codes, i.e., commands, which control the operation of a scanner.

Scanner Format Information: Instructions and information a scanner receives in scanner control language (SCL) which define the procedures to be followed by the scanner in digitizing input information. Format information can, by way of example and not limitation, include dimensional information indicating the size of a document being scanned; the dpi resolution to be utilized by the scanner; whether the scan should be made in black and white or in color; etc.

Text: (1) Data comprised only of standard characters (i.e., ASCII characters, EBCDIC characters, etc.), without any special formatting codes. (2) In text processing, a sequence of elements intended to convey a meaning whose interpretation is essentially based upon the reader's knowledge of some natural language or artificial language; for example, a business letter printed on paper or displayed on a screen. The elements may consist of characters, symbols, words, phrases, paragraphs, sentences, or tables.

Word Processor: See Word Processing Program.

Word Processing Program: (1) A program that transforms a computer into a tool for creating, editing, proofreading, formatting, and printing documents. (2) A word processing program merges text editors and formatters into one program so that the results of most formatting commands are displayed on screen (WYSIWYG). Graphical user interface (GUI) systems as WINDOWS enable word processing programs to display fonts and font size choices on screen. Some of today's word processing software can take on light desktop publishing duties, such a newsletter production, while still offering a writer all the necessary tools for the creation, editing, proofing, formatting, and printing of text.

When, in prior art computer systems, a user wishes to incorporate a scanned image into an application program, for example a database program, the user exits or inactivates the database program. A scanner is utilized to digitize the information. The digitized information is assigned an image file name and auxiliary storage location in the computer system outside of the database. The user reenters or reactivates the database program and imports the digitized information from the storage location to the database. This is a fragmented process. If the user forgets the information stored at the auxiliary storage location, or forgets the image file name, the user may not be able to retrieve the desired information into the database. Databases which, like those utilized by insurance companies and others, contain many records into which many documents or other information must constantly be imported, greatly increase the likelihood that a database user will (a) forget to enter into a record the image file name and its auxiliary storage location, (2) enter the image file name and auxiliary storage location in the wrong record, or (3) enter into a record the an incorrect image file name and storage location.

Accordingly, it would be highly desirable to provide an information processing system which enabled the file name and location of scanned information to be directly incorporated in an application program without requiring the user to exit the application program.

Figure 2:
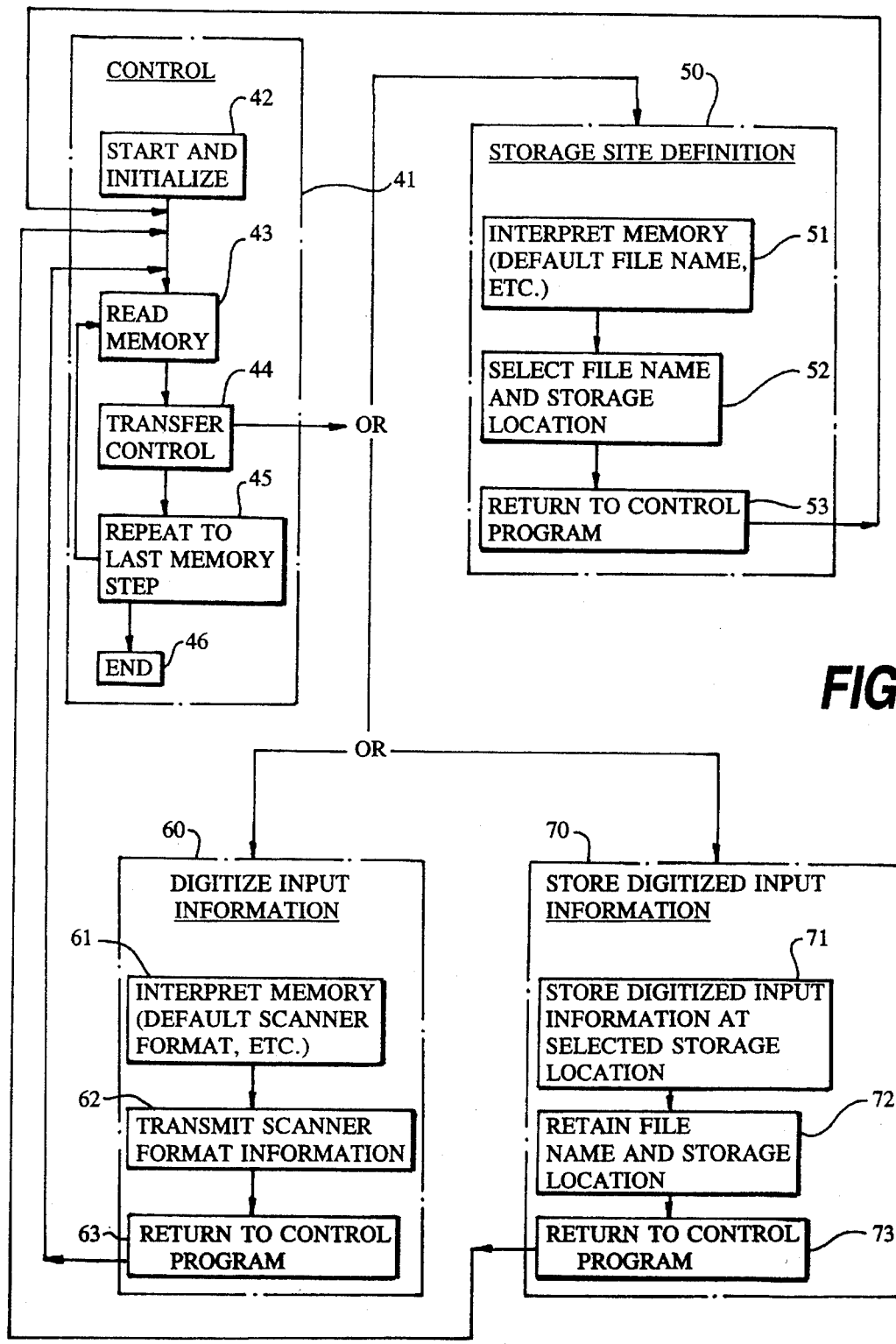

These and other, further and more specific objects and advantages of the invention will be apparent to those skilled in the art from the following detailed description thereof, taken in conjunction with drawings, in which:

FIG. 1 is a block diagram illustrating an improved information processing system embodying the present invention; and, FIG. 2 is a block diagram which illustrates a typical program of logic function utilized in accordance with the presently preferred embodiment of the invention.

Briefly, in accordance with the invention, I provide improved apparatus for processing input information. The apparatus includes a scanner for creating digital representations of the input information, the scanner having a scanner control language; a computer; an operating system in the computer to control the computer and to communicate with the scanner using the scanner control language; and, an application program in the computer. The application program communicates with the operating system such that the application program transmits scanner format information to said operating system, such that the operating system transmits to the scanner in the scanner control language the scanner format information, and such that the scanner after digitizing the input information transmits to the operating program a digitized stream of the information.

In another embodiment of the invention, I provide a method for processing input information. The method includes the steps of providing a scanner for creating digital representations of the input information, the scanner having a scanner control language; a computer; providing an operating system in the computer to control the computer and to communicate with the scanner using the scanner control language; and, providing an application program in the computer. The application program includes means to communicate with the operating system. Scanner format information is transmitted with the application program to the operating system. The scanner format information is transmitted by the operating system to the scanner in the scanner control language. The scanner generates digital representation of the input information and transmits to the operating system a digitized stream representing the input information.

Turning now to the drawings, which depict the presently preferred embodiments of the invention for the purpose of illustrating the practice thereof and not by way of limitation of the scope of the invention, FIG. 1 is a block diagram which illustrates a preferred embodiment of the information processing apparatus and method of the invention, the main components of which are a controller 11, memory 12, and scanner 14. Data input 13 is provided.

As indicated by the dashed lines, the controller 11 performs the functions of storage site definition 11A, digitizing input information 11B, and storage of digitized input information 11C. The memory 12 contains both storage site information 12A and scanner format information 12B.

The memory 12 can be any suitable prior art memory unit such as are commonly utilized in computers and in the storage and processing of input information. For example, electromagnetic memories such as magnetic, optical, solid state, etc. or mechanical memories such as paper tape. The storage site information 12A stored in the memory can consist of data entered by data input 13 such as a file name, program or data defining a storage location for digitized input information, etc. The storage site information 12A can also include file names and storage locations selected by an application program and/or operating as described below. Similarly, the scanner format information 12B stored in memory 12 can consist of scanner format information which is provided by data input 13, by an application program, or by the operating system of the controller 11. Data input 13 can consist of a conventional computer keyboard or of any other desired means for entering alphanumeric or other types of data.

During operational cycles, the storage site information, namely the file name and storage location, are provided to or determined by 11A the controller, after which the input information is digitized 11B, and the resulting digitized input information is stored 11C.

FIG. 2 is a block flow diagram which illustrates a typical program or logic function which is executed by an application program in the controller 11 during the processing of input information by the apparatus of the invention. The basic control program 41 of the application program consists of commands to "start and initialize" 42, "read memory" 43 and "transfer control" 44 to the storage site definition sub-routine 50, digitize input information sub-routine 60, or store digitized input information sub-routine 70.

The storage site definition sub-routine 50 consists of commands to "interpret memory" 51, "select file name and storage location" 52, and "return to control program" 53. During the "interpret memory" 51 step a determination is made whether the file name has been provided to the application program by data input 13, whether there is no file name and the application program defaults to a file name, whether the operating system (i.e., DOS or some other operating system) provides the file name, or whether some other means is utilized to select the file name. The scanner 14 presently can not provide a file name or storage location for the file. During the "interpret memory" 51 step a determination is also made whether the storage location of digitized input information has been provided to the application program by data input 13, whether there is no storage location and the operating system must be asked to provide a storage location, or whether some other means is utilized to select the storage location. Since, in the presently preferred embodiment of the invention, the operating system presently normally selects the storage location for a scanner generated digitized stream of data defining selected input information, the database or other application program typically requests the operating system to select a storage location and, if desired, a file name. Both the application program and the operating system retain in memory the file name and storage location selected 51. The storage location can be a hard disk, CD, magnetic tape, etc.

The digitized input information sub-routine 61 includes the steps of "interpret memory" 61, "transmit scanner format information" 62, and "return to control program" 63. During the "interpret memory" step 61, the application program determines whether scanner format information was provided from data input 13, whether there was no scanner format information provided by data input 13 and a default defining scanner formation information is to be selected, whether there is no scanner format information and no default and the user must be requested to provide scanner format information, etc. The scanner format information is presently typically provided by either by the user entering appropriate scanner format information using data input 13 or by default to scanner format information in the application program. Once the scanner format information is selected, the application program transmits 62 the scanner format information to the operating system. In order for the application program to communicate with the scanner 14 and to utilize the digital stream of data produced by the scanner 14 and stored by the operating system, the application program must understand the graphic file format utilized by the scanner 14 or must be able to convert the graphic file format of the scanner 14 into a format which can be used by the application program.

The store digitized input information 70 subroutine includes the steps of "store digitized input information at selected storage location" 71, "retain file name and storage location" 72, followed by "return to control program" 73. During step 71, the application program directs the operating system to transmit the scanner format information to the scanner 14 and directs the operating system to be ready to receive a stream of digitized data and to store the digitized stream of data under the file name and at the storage location defined in sub-routine 50. After the application program transmits 62 the scanner format information to the operating program, the scanner digitizes, according to the scanner format information, the input information provided for or inserted in the scanner 14 and transmits a digitized stream representing the input information to the operating system. The operating system stores the digitized stream of data under the data file name and at the storage location selected 52 in sub-routine 50. After the operating program stores the digitized stream of data at the selected location, the operating program notifies the application program that the digitized stream has been stored at the designated location under the designated file name. After the application program is so notified, the application program retains 72 the file name and storage location of the digitized stream representing the input information. If, for example, the application program is a database program, the database program can store the selected file name and storage location on a clipboard while the input information is being digitized and can then, after the database program receives confirmation from the operating program that the digitized stream of data defining the input information has been stored under the selected file name and at the selected storage location, transfer the file name and storage location to permanent memory in the database program in a directory in a selected file. Once the file is so stored, the database program can retrieve and import into the database program the data file from storage into the database program so the database program can manipulate the input information in the file.

Having described my invention in such terms as to enable those skilled in the art to understand and practice it, and having identified the presently preferred embodiments thereof, I claim:

1. Apparatus for processing input information, said apparatus comprising (a) scanner means for creating digital representations of the input information, said scanner means having a scanner control language;
(b) a computer;
(c) an operating system in said computer to control said computer and to communicate with said scanner means using said scanner control language;
(d) an application program in said computer, said program including means to communicate with said operating system such that
  (i) said application program transmits scanner format information to said operating system,
  (ii) said operating system transmits to said scanner means in said scanner control language said scanner format information,
  (iii) said scanner means after digitizing the input information transmits to said operating system a digitized stream representing the input information.

2. A method for processing input information, said method comprising the steps of
(a) providing
  (i) scanner means for creating digital representations of the input information, said scanner means having a scanner control language;
  (ii) a computer;
  (iii) an operating system in said computer to control said computer and to communicate with said scanner means using said scanner control language;
  (iv) an application program in said computer, said program including means to communicate with said operating system;
(b) transmitting with said application program scanner format information to said operating system,
(c) transmitting to said scanner means with said operating system said scanner format information in said scanner control language,
(d) generating with said scanning means digital representations of the input information;
(e) transmitting to said operating system with said scanner means a digitized stream representing the input information.

3. Apparatus for processing input information, said apparatus comprising
(a) scanner means for creating digital representations of the input information, said scanner means having a scanner control language;
(b) a computer;
(c) an operating system in said computer to control said computer and to communicate with said scanner means using said scanner control language;
(d) an application program in said computer, said program including means to communicate with said operating system such that
  (i) a file name and storage location are selected,
  (ii) said operating system transmits scanner format information to said scanner means in said scanner control language,
  (iii) said scanner means after digitizing the input information transmits to said operating system a digitized stream representing the input information, and
  (iv) said operating system stores said digitized stream in said storage location and confirms to said application program the file name and storage location of said digitized stream.

4. A method for processing input information, said method comprising the steps of
(a) providing
  (i) scanner means for creating digital representations of the input information, said scanner means having a scanner control language;
  (ii) a computer;
  (iii) an operating system in said computer to control said computer and to communicate with said scanner means using said scanner control language;
  (iv) an application program in said computer, said program including means to communicate with said operating system;
(b) selecting a file name and storage location with said application program and said operating system;
(c) transmitting with said operating system scanner format information to said scanner means in said scanner control language;
(d) digitizing said input information with said scanner;
(e) transmitting with said scanner means to said operating system a digitized stream representing the input information;
(f) storing said digitized stream in said storage location; and
(g) confirming to said application program with said operating system said storage location and said file name of said digitized stream.

* * * * *